United States Patent
Tomita

(10) Patent No.: US 7,612,928 B2
(45) Date of Patent: Nov. 3, 2009

(54) OPTICAL SCANNING APPARATUS, IMAGE FORMING APPARATUS USING THE SAME AND METHOD OF REGULATING THE OPTICAL SCANNING APPARATUS

(75) Inventor: Yasumasa Tomita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 11/790,556

(22) Filed: Apr. 26, 2007

(65) Prior Publication Data

US 2007/0253049 A1   Nov. 1, 2007

(30) Foreign Application Priority Data

Apr. 27, 2006   (JP)   ............... 2006-123526

(51) Int. Cl.
*G02B 26/08* (2006.01)
(52) U.S. Cl. .................................. 359/204.1
(58) Field of Classification Search .............. 359/204.1, 359/216.1
See application file for complete search history.

(56) References Cited

U.S. PATENT DOCUMENTS

| | | | |
|---|---|---|---|
| 4,578,689 A | * | 3/1986 | Spencer et al. ............... 347/250 |
| 6,204,868 B1 | | 3/2001 | Yamauchi et al. |
| 6,376,837 B1 | | 4/2002 | Itabashi et al. |

2004/0179089 A1   9/2004   Hayashi

FOREIGN PATENT DOCUMENTS

| | | |
|---|---|---|
| JP | 60-029720 | 2/1985 |
| JP | 61-277260 | 12/1986 |
| JP | 09-039295 | 2/1997 |
| JP | 09-159956 | 6/1997 |
| JP | 2001-171164 | 6/2001 |
| JP | 2005-250319 | 9/2005 |

OTHER PUBLICATIONS

Search Report dated May 28, 2008 for counterpart European Application No. 07251775.8-2004.

* cited by examiner

*Primary Examiner*—Euncha P Cherry
(74) *Attorney, Agent, or Firm*—Harness, Dickey & Pierce, P.L.C.

(57) ABSTRACT

An optical scanning apparatus includes a plurality of light sources for emitting light beams and a rotary deflector for deflecting the light beams. A revolution number (Rm) of the rotary deflector is reduced to Rdef×(V/Vmax) if V/Vmax is greater than a value; and the revolution number (Rm) thereof is reduced to Rdef×(V/Vmax)×m and the number of the light beams is reduced to Ndef/m if V/Vmax is not greater than the value. V is a process linear velocity of the image forming apparatus; Vmax is a maximum process linear velocity thereof; Ndef is the number of the light beams at the maximum process linear velocity Vmax; and Rdef is the revolution number of the rotary deflector thereat; and m is a positive integer, and Vmax is greater than V (Vmax>V).

16 Claims, 5 Drawing Sheets

OPTICAL SCANNING APPARATUS, IMAGE FORMING APPARATUS USING THE SAME AND METHOD OF REGULATING THE OPTICAL SCANNING APPARATUS

PRIORITY STATEMENT

This patent application is based on and claims priority under 35 U.S.C. §119 from Japanese patent application No. JP2006-123526 filed on Apr. 27, 2006 in the Japan Patent Office, the entire contents of which are incorporated herein by reference.

BACKGROUND

1. Field

Example embodiments generally relate to an optical scanning apparatus, an image forming apparatus including the same and a method of regulating the optical scanning apparatus.

2. Discussion of the Background

Image forming apparatuses such as a laser beam printer, a digital copier, a laser facsimile are equipped with an optical scanning apparatus which writes a latent image on an image carrier or a photoreceptor.

Such an optical scanning apparatus is structured such that, for example, a light flux or an light beam from an optical source is deflected by a rotary deflector so that the photoreceptor is exposed and scanned by the light flux or the light beam.

There is a demand for an image forming apparatus that is capable of handling various types of paper. An image forming apparatus, which may accommodate not only a sheet of commonly used paper, but also a post card, release coated paper, thin paper such as tracing paper and so forth, is desired by users.

In printing processing of an electrophotographic-type image forming apparatus, a latent image is formed on an image carrier by an optical scanning apparatus. The developing mechanism visualizes the latent image with toner, and produces a toner image.

Subsequently, the toner image is transferred onto a printable medium such as a transfer sheet and is fixed. Then, the transfer sheet is ejected outside the image forming apparatus.

Generally, fixing the toner image on a sheet of paper having a relatively large thickness requires greater heat amount when compared with fixing on standard paper. Consequently, a process linear velocity and a printing speed are reduced so that the heat amount per unit of time is increased, thereby securing fixability.

As a result, when printing on relatively thick paper, the printing speed is reduced and the productivity is also reduced.

In order to accommodate an increasing need for color printing in recent years, a color image forming apparatus which forms a full-color image by overlaying four different colors of toner, black (Bk), magenta (M), cyan (C) and yellow (Y) is known. Such an image forming apparatus also requires a larger heat amount for fixing an image when compared with a single-color (e.g., black) image forming apparatus, because four different colors are overlaid on one another.

In the case of color image forming apparatus, when a full-color image is formed, the process linear velocity is reduced. In other words, the productivity is reduced when compared with a single-color (black) image forming apparatus.

In order to accommodate various demands of users, an image forming apparatus normally has a plurality of process linear velocities so that the linear velocity may be changed according to different modes such as paper types and switching between a monochrome mode and a color mode.

When the process linear velocity is reduced so as to reduce the printing speed, the number of rotations or the revolution number the rotary deflector may also be reduced by a ratio relative to a default linear velocity. On the contrary, when the range of the process linear velocity V [mm/sec] is increased, the range of the revolution number of the rotary deflector will be increased, accordingly.

A DC brushless motor is commonly used for a motor used in the rotary deflector. Depending on an optimal range of input clock to the motor or the types of shaft bearing or shaft bearing structures, an optimal revolution number is already predetermined to some extent.

When the motor is operated out of the optimal range of revolution number, the characteristics of the motor may not be satisfied.

In a case where the motor is rotated significantly less than the optimal range of the revolution number, it is known that low frequency jitter or a rotation variation may be worsened. As a result, an image distortion such as a fluctuation image may be generated.

In a case where the motor is rotated beyond the optimal range of the revolution number, problems with the product life of the motor itself, heat generation and noise may be generated.

In light of this, it is desired that the rotary deflector includes an optimal revolution number and is used within a range of the revolution number as minimum range as possible. Thereby, an effect in which the time required for switching the revolution number is reduced may be attained, for example.

In addition, in a case where the process linear velocity is changed so as to keep an exposure energy on the photoreceptor per unit of time at a constant level, it may be necessary to change an amount of exposure light onto the photoreceptor to form a latent image on the image carrier, accordingly.

In other words, it may be necessary to change the output of the laser beam emission from the light source according to the change in the process linear velocity.

Normally, when a constant k which is obtained based on an optical specification of the scan lens disposed in the optical scanning apparatus, an exposure sensitivity and a necessary exposure width of the photoreceptor, are fixed, the exposure light amount P onto the photoreceptor is given by: $P = k \times V/N$, where V[mm/sec] is a linear velocity, and N is the number of light sources.

Similar to the revolution number of the rotary deflector, when the range of the linear velocity V[mm/sec] is wide, the range of the amount of the exposure light may become also wide.

A laser diode used as an optical source, for example, may not be able to stably emit light in an output range less than or equal to the 15% of a rated output. Consequently, it is possible to generate problems associated with a beamspot diameter and an LD modulation. As a result, an image deviation may occur.

Furthermore, when the laser diode is used at the limit of the rated output, it may accelerate the deterioration of the product life of the laser diode. Thus, the reliability of the entire apparatus may also be deteriorated.

In such an optical scanning apparatus as described above, there is normally provided a synchronous detector which regulates a writing start position in a main scan direction relative to an image carrier. Generally, while the laser beam emitted from the light source is deflected and scanned by the rotary deflector, the laser beam is led to the synchronous detector positioned outside the image formation area so that timing is electronically met, and the writing start position of the main scan direction is regulated.

The synchronous detector equipped with a photo IC for receiving light on a printed circuit board is common. However, the photo IC has a characteristic in which the output varies depending on the amount of the incident light striking the light receiving surface.

In a case where the amount of the incident light varies, the timing of the writing start position may not be constant which may cause image deviation due to the image deviation, deterioration of the accuracy of color alignment and/or deterioration of reproduction of color during full-color image formation.

Furthermore, an output of a photo IC may vary depending on the scan speed of the light beam. In a case where the revolution number of the rotary deflector is changed according to the change in the process linear velocity, the output of the photo IC may also vary. Thus, as described above, similar to the case in which the amount of the incident light to the photo IC may change, the timing of the writing start position may not be constant, thereby inducing an abnormal image.

In order to accommodate recent growing needs for higher speed operation, a multi-beam optical scanning apparatus is often used in image forming apparatuses such as a printer, a facsimile and a copier. The laser diode to be used in the optical source, for example, has a lifetime longer than a mechanical lifetime, and thus a longer operation than the apparatus is assured.

However, there is a possibility that the laser diode may fail or deteriorate early so that the operation is impaired. If the entire image forming apparatus fails to operate, printing operation is discontinued until a repairman comes to fix the problem. Furthermore, a maintenance fee and a labor cost and the like may increase.

SUMMARY

In view of the foregoing, the example embodiments provide an optical scanning apparatus and an image forming apparatus using the same. The optical scanning apparatus may include a plurality of light sources for emitting light beams and/or a rotary deflector for deflecting the light beams.

In example embodiments, a revolution number (Rm) of the rotary deflector may be reduced to Rdef×(V/Vmax) if V/Vmax is greater than a predetermined or given value; and the revolution number (Rm) thereof may be reduced to Rdef×(V/Vmax)×m and the number of the light beams may be reduced to Ndef/m if V/Vmax is not greater than the predetermined value when the revolution number of the rotary deflector, or the revolution number thereof as well as the number of the light beams may be changed in accordance with switching of a process linear velocity of an image forming apparatus where V is a process linear velocity of the image forming apparatus; Vmax is a maximum process linear velocity thereof; Ndef is the number of the light beams at the maximum process linear velocity Vmax; and Rdef is the revolution number of the rotary deflector thereat; and m is a positive integer, and wherein Vmax is greater than V (Vmax>V).

In example embodiments, the predetermined value is 0.75.

In example embodiments, the following relationship is satisfied when Rm is greater than Rdef (Rm>Rdef):

$Rm/Rdef < 1.5$.

In example embodiments, a pixel density in a sub-scan direction is at least doubled when V/Vmax is less than 0.5 (V/Vmax<0.5).

In example embodiments, the rotary deflector includes a plurality of reflective surfaces. The plurality of reflective surfaces are alternately irradiated when V/Vmax is less than 0.5 (V/Vmax<0.5).

In example embodiments, Rm satisfies the following relationship:

Rmax<1.5×Rmin, where Rmax is a maximum revolution number and Rmin is a minimum revolution number of the rotary deflector.

In example embodiments, the following relationship is satisfied:

5×(Vmax/Ndef)<V/N<1.5×(Vmax/Ndef), where N is the number of light beams.

In example embodiments, an optical scanning apparatus may further include a synchronous detector for regulating a write start position in a main scan direction. The synchronous detector may receive a constant amount of incident light.

In example embodiments, the write start position in the main scan direction is adjusted by a dot unit when changing the revolution number of the rotary deflector.

In example embodiments, scanning is performed using any number of light sources when reducing the number of optical beams of the light sources.

Example embodiments of the above mentioned image forming apparatus may include the above-mentioned optical scanning apparatus. The image forming apparatus can switch between a plurality of process linear velocities.

Example embodiments provide a method of controlling an optical scanning apparatus which includes a plurality of light sources for emitting light beams and a rotary deflector for deflecting the light beams.

The method may include: reducing a revolution number (Rm) of the rotary deflector to Rdef×(V/Vmax) if V/Vmax is greater than a predetermined value and/or reducing the revolution number (Rm) thereof to Rdef×(V/Vmax)×m and the number of the light beams to Ndef/m if V/Vmax is not greater than the predetermined value when the revolution number of the rotary deflector, or the revolution number thereof as well as the number of the light beams are changed in accordance with switching of a process linear velocity of an image forming apparatus, where V is a process linear velocity of the image forming apparatus; Vmax is a maximum process linear velocity thereof; Ndef is the number of the light beams at the maximum process linear velocity Vmax; and Rdef is the revolution number of the rotary deflector thereat; and m is a positive integer, and wherein Vmax is greater than V (Vmax>V).

In example embodiments, the predetermined value is 0.75.

In example embodiments, an optical scanning apparatus may include a plurality of light sources configured to emit light beams and a rotary deflector configured to deflect the light beams, wherein a revolution number (Rm) of the rotary deflector is variable based on a plurality of process linear velocities.

In example embodiments, the revolution number (Rm) of the rotary deflector is switchable based on the plurality of process linear velocities.

Additional features and advantages of example embodiments will be more fully apparent from the following detailed description, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of example embodiments when considered in connection with the accompanying drawings, wherein.

DETAILED DESCRIPTION OF EXAMPLE EMBODIMENTS

Figure 1:
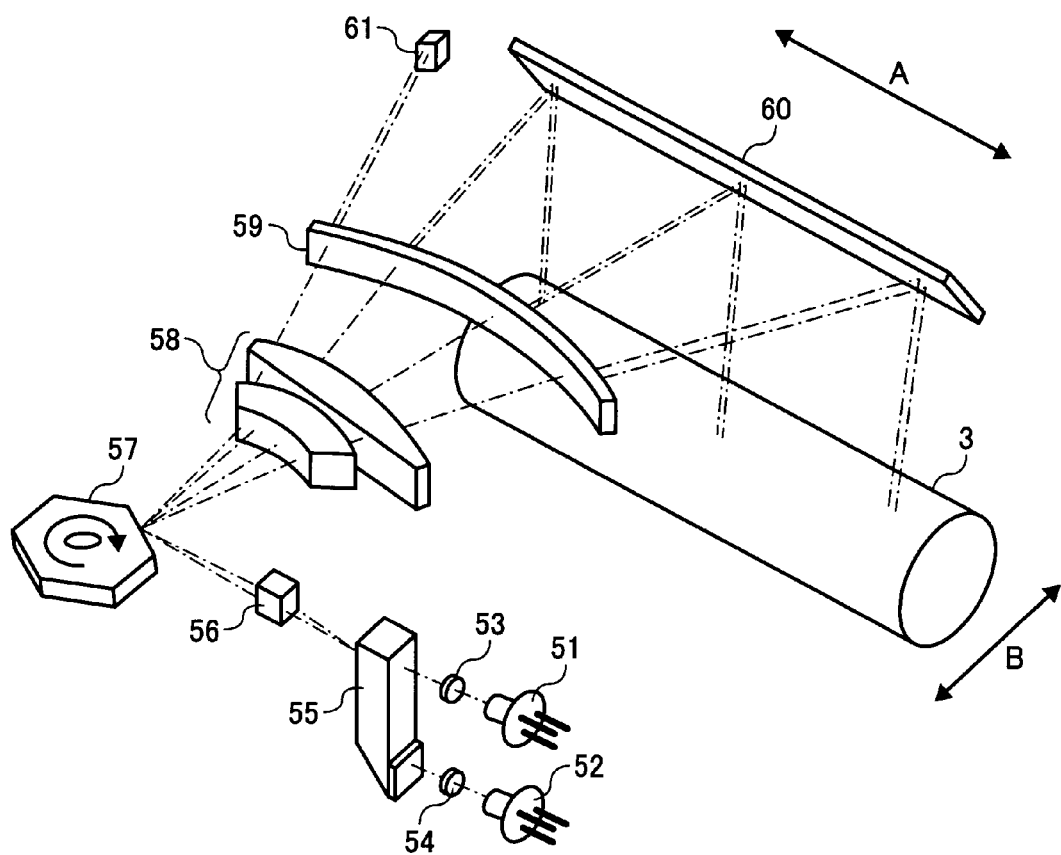
FIG. 1 is a perspective view illustrating an example of an optical scanning apparatus according to example embodiments.

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present.

Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms.

These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "fan" and "the" are intended to include the plural forms as well, unless the context clearly indicates otherwise.

It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Example embodiments are now explained below with reference to the accompanying drawings. In the later described comparative example, example embodiment, and alternative example, for the sake of simplicity of drawings and descriptions, the same reference numerals will be given to constituent elements such as parts and materials having the same functions, and the descriptions thereof will be omitted unless otherwise stated.

Referring now to the drawings, wherein like reference numerals designate identical or corresponding parts throughout the several views, particularly to FIG. 1, a structure of a laser printer as an image forming apparatus according to example embodiments is described.

Typically, but not necessarily, paper is the medium from which is made a sheet on which an image is to be formed. Other printable media is available in sheets and their use here is included. For simplicity, this Detailed Description section refers to paper, sheets thereof, paper feeder, etc. It should be understood, however, that the sheets, etc., are not limited only to paper.

Example embodiments will be explained below with reference to drawings. FIG. 1 is a perspective view illustrating an example of an optical scanning apparatus to which example embodiments may be applied.

The optical scanning apparatus 50 shown in FIG. 1 is a multi-beam optical scanning apparatus, and is equipped with a first laser diode 51 and a second laser diode 52 which constitute a multi-beam light source unit. The multi beams emitted from the laser diodes 51 and 52 are transformed into parallel light fluxes by collimating lenses 53 and 54, respectively.

The light fluxes are combined by a synthetic prism 55, and then are focused by a cylinder lens 56 in a sub-scan direction shown by an arrow B in FIG. 1.

Subsequently, the multi beams which are reflected by a polygon mirror 57 serving as a rotary deflector pass through fθ lenses 58 and a toroidal lens 59 so that a dot pitch in a main scan direction shown by an arrow A in FIG. 1 is equalized. The multi beams are then reflected by a reflective mirror 60 and scanned over a photoreceptor drum 3. Thereby, print data is written thereon.

A synchronous detection sensor 61 is disposed outside an image area. When the emission of laser beam from the first laser diode 51 is detected by the synchronous detection sensor 61, its detection timing becomes the basis of the start position of a first line of the main scan.

When the emission of laser beam from the second laser diode 52 is detected by the synchronous detection sensor 61, its detection timing becomes the basis of the start position of a second line of the main scan. The same process may be performed for each line of the main scan so as to align the position of the main scan image.

The image forming apparatus according to one example embodiments equipped with such an optical scanning apparatus serving as an optical writing mechanism described above may include a plurality of linear velocities as process linear velocities.

The process linear velocities may include:
77 [mm/sec], 115 [mm/sec], 154 [mm/sec], 205 [mm/sec] and 230 [mm/sec]. Corresponding modes for each linear velocity may be as follows:

Pattern A: 77 [mm/sec], heavy paper (no more than 253 g/m$^2$)
Pattern B: 115 [mm/sec], heavy paper (no more than 169 g/m$^2$)
Pattern C: 154 [mm/sec], standard paper, low-speed mode when printing full-color
Pattern D: 205 [mm/sec], standard paper, high-speed mode when printing full-color
Pattern E: 230 [mm/sec], standard paper, high-speed mode when printing in a single color, black (Bk).

When the optical scanning apparatus 50 is a multi-beam optical scanning apparatus with the number of optical sources expressed by N=2, the revolution number Rm of the rotary deflector corresponding to each linear velocity described above may be as shown in TABLE 1.

In the optical scanning apparatus 50, V[mm/sec] is a process linear velocity. Rm[rpm] is the revolution number of the rotary deflector. M is the number of reflecting surfaces of the rotary deflector. N is the number of light sources. $\rho$ [dpi] is a pixel density. V is a process linear velocity.

number may be between 20000 rmp and 30000 rmp, or between 25000 rpm and 37500 rpm.

When the DC brushless motor is used beyond the range of the revolution number described above, there is a possibility that the characteristics of the motor may not be achieved.

In addition, if the range of the revolution number needs to be wide, a shaft bearing structure which can accommodate the respective revolution number may be necessary, and a circuit constant may need to be optimized. Consequently, the cost of parts for the rotary deflector may increase.

In an image forming apparatus according to one example embodiments, Vmax is the maximum process linear velocity, Ndef is the number of the light beams, and the Rdef is the revolution number of the rotary deflector. "def" refers to a default value.

In a case where the process linear velocity is reduced from Vmax to V (Vmax is greater than V), when V/Vmax is greater than 0.75 (V/Vmax>0.75), that is, V/Vmax is greater than the 75% of the maximum process linear velocity, the revolution number Rm of the rotary deflector may be reduced to Rm=Rdef×(V/Vmax).

When V/Vmax is less than or equal to 0.75 (V/Vmax≦0.75), that is, V/Vmax is less than or equal to the 75% of the maximum process linear velocity, the number of the optical sources may be reduced to Ndef/m, where m is a

TABLE 1

|  | PATTERN A | PATTERN B | PATTERN C | PATTERN D | PATTERN E |
|---|---|---|---|---|---|
| LINEAR VELOCITY: [mm/sec] | 77 | 115 | 154 | 205 | 230 |
| NUMBER OF BEAMS: N | 2 | 2 | 2 | 2 | 2 |
| NUMBER OF POLIGONAL SURFACES: M | 6 | 6 | 6 | 6 | 6 |
| PIXEL DENSITY: $\rho$ [dpi] | 600 | 600 | 600 | 600 | 600 |
| REVOLUTION NUMBER: Rm[rpm] | 9094.5 | 13582.7 | 18189.0 | 24212.6 | 27165.4 |

The maximum process linear velocity Vmax is 230 [mm/sec], which is a process linear velocity of PATTERN E. In PATTERN E, the number of light beams Ndef is 2, and the number of rotary deflectors Rdef is 27165.4 [rpm]. "def" refers to a default value.

As shown in TABLE 1, if the number of light sources is fixed to 2, the revolution number of the rotary deflector will be in the range between 9094.5 and 27165.4 [rpm] at the process linear velocity described above. When compared with the minimum revolution number, the maximum revolution number is approximately three times greater.

In a case where the range of the revolution number is configured as described above, low-frequency jitter and/or rotation fluctuation and so forth may be worsened when rotating at a low speed. As a result, an image defect such as a fluctuation of image may be induced.

When using the DC brushless motor to be used in the rotary deflector to drive the polygon mirror 57, the appropriate revolution number may be approximately 1.5 times greater than the minimum revolution number in general. For example, if a type of a shaft bearing which holds the rotary polygon mirror is of an oil-dynamic pressure type, the range of the revolution natural number, and in the meantime, the revolution number Rm of the rotary deflector may be configured to satisfy Rm=Rdef×(V/Vmax)×m.

In other words, when reducing the linear velocity to the value greater than or equal to the 75% of the maximum process linear velocity, it may be necessary to reduce the revolution number of the rotary deflector in accordance with a ratio of the linear velocity.

When reducing the linear velocity to the value less than or equal to the 75% of the maximum process linear velocity, the number of the optical sources may be reduced, and the revolution number Rm of the rotary deflector may be configured to satisfy Rm=Rdef×(V/Vmax)×m.

Normally, the DC brushless motor used in the rotary deflector may stably be operated when the revolution number is approximately the 75% of the optimal revolution number. Thus, in example embodiments, the value of the 75% of the maximum process linear velocity is used as a threshold value for controlling the reduction of the revolution number of the rotary deflector, or the revolution number of the rotary deflector and the light source.

However, the ratio does not have to be 75%. The ratio may be modified based on the characteristics of the motor, accordingly.

With reference to TABLE 2, a detailed description will be given of an example setting for regulating the optical scanning apparatus 50.

TABLE 2

|  | PATTERN A | PATTERN B | PATTERN C | PATTERN D | PATTERN E |
|---|---|---|---|---|---|
| LINEAR VELOCITY: V[mm/sec] | 77 | 115 | 154 | 205 | 230 |
| RATIO AGAINST Vmax | 0.3 | 0.5 | 0.7 | 0.9 | — |
| NUNBER OF BEAMS: N | 1 | 1 | 1 | 2 | 2 |
| NUMBER OF POLIGONAL SURFACES: M | 6 | 6 | 6 | 6 | 6 |
| PIXEL DENSITY: ρ [dpi] | 600 | 600 | 600 | 600 | 600 |
| REVOLUTION NUMBER: Rm[rpm] | 18189.0 | 27165.4 | 36378.0 | 24212.6 | 27165.4 |
| V/N | 77.0 | 115.0 | 154.0 | 102.5 | 115.0 |

As may be seen in TABLE 2, the maximum process linear velocity Vmax is 230 [mm/sec]. The number N of light beams from the light source is 2 when the maximum process linear velocity Vmax is 230 [mm/sec]. PATTERN E is a default setting.

In a case of PATTERN D, V/Vmax is greater than 0.75, that is, V/Vmax>0.75. Thus, the number of beams remains unchanged. Simply, the revolution number of the polygon mirror 57 is reduced from 27165.4 to 24212.6 according to the linear velocity ratio.

In a case of PATTERN A, B and C, the number of beams is reduced from 2 to 1, that is, the number of beams is reduced by half. The revolution number Rm of the polygon mirror 57 is set to satisfy Rm=Rdef×(V/Vmax)×2. The revolution number of the polygon mirror 57 for PATTERN A, B and C is 18189.0, 27165.4, and 36378.0, respectively.

In such a manner, the range of the revolution number of the rotary deflector is between 18189.0 and 36378.0 [rpm]. The maximum revolution number may be approximately twice as much as the minimum revolution number. Thereby, it is possible to set a narrow range of revolution number of the polygon mirror 57, and the characteristics of the rotary deflector or the motor which drives the rotary deflector may be used in a more favorable condition.

When Rm is greater than Rdef (Rm>Rdef) at the time the revolution number of the rotary deflector is changed, it is preferred to set Rm/Rdef to be less than 1.5, that is, Rm/Rdef<1.5. In other words, when the revolution number of the polygon mirror 57 is increased relative to the base linear velocity or the default linear velocity, the ratio may be no more than 1.5.

In the example setting shown in TABLE 2, the maximum revolution number Rmax is 36378.0 [rpm], whereas, the revolution number at the default linear velocity Rdef is 27165.4 [rpm]. The ratio of Rmax to Rdef is approximately 1.3, that is, Rmax is no more than 1.5 times as much as Rdef.

When the revolution number of the rotary deflector is increased, adverse effects such as a temperature rise or an increase in noise and vibration may be induced.

However, when the number of increase in the revolution number is no more than 1.5 times, such adverse effects may be suppressed at minimum. In the meantime, it is possible to set the narrow range of the revolution number, thereby making it possible to use the characteristics of the rotary deflector or the motor that drives the rotary deflector in an optimal condition.

In a case where Rmax/Rdef is greater than 1.5, that is, Rmax/Rdef>1.5, the revolution number may be reduced according to the ratio of the linear velocity, as described above. In other words, the revolution number may be determined by increasing or reducing the number of beams from the light source such that Rmax/Rdef<1.5 is satisfied.

In the example setting shown in TABLE 2, the range of the revolution number of the polygon mirror 57 is between 18189.0 and 36378.0 [rpm]. When compared with the example shown in TABLE 1, the range of the revolution number is narrower. However, the maximum revolution number shown in TABLE 2 is still approximately twice as much as the minimum revolution number.

When V/Vmax is less than 0.5, that is, the linear velocity is less than the 50% of the maximum process linear velocity, the exposure scan may be performed while the pixel density in at least a sub-scan direction is doubled.

Furthermore, when V/Vmax is less than 0.5, that is, the linear velocity is less than the 50% of the maximum process linear velocity, the exposure scan is performed on every other surface of a plurality of the reflective surfaces of the rotary deflector.

Figure 3:
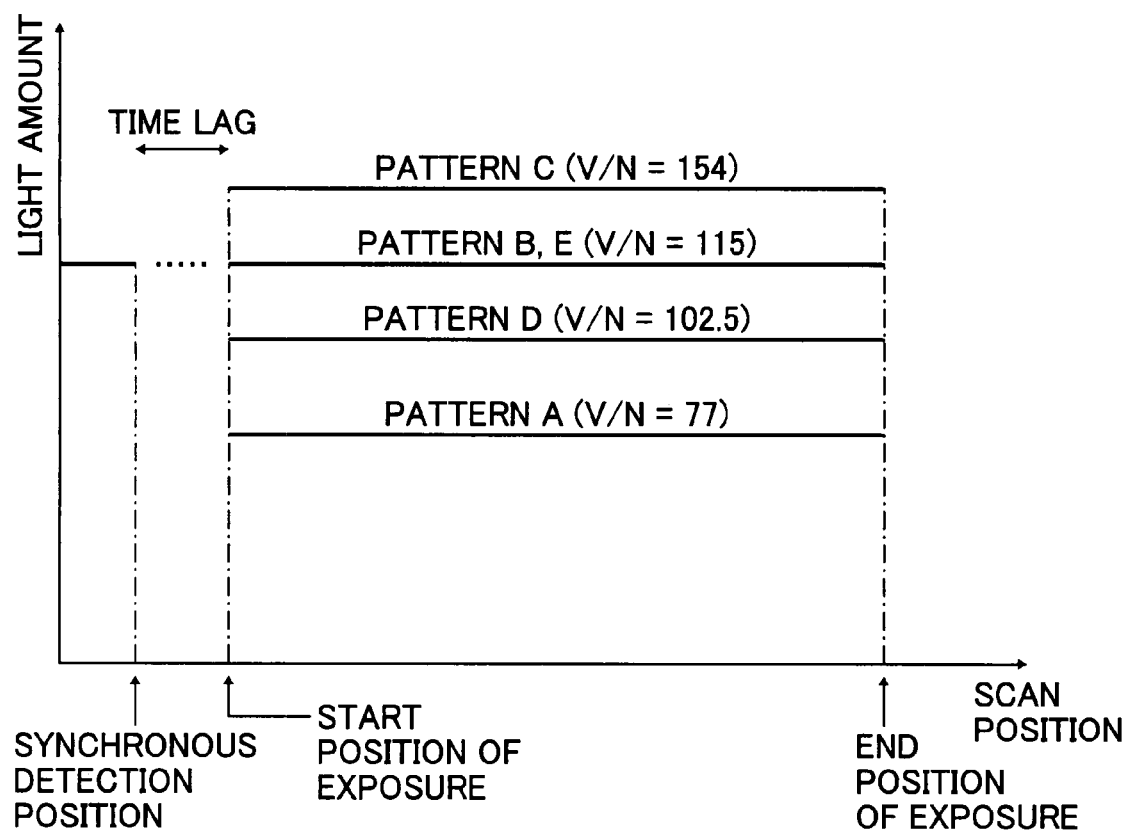
FIG. 3 is a schematic diagram illustrating a conceptual idea of a control of the incident light to a synchronous detector according to example embodiments.

With reference to FIG. 3, a detailed description will be given of an example setting when performing the double-density scan or the plurality of the reflective surfaces of the rotary deflector is alternately exposed.

TABLE 3

|  | PATTERN A' | PATTERN A" |
|---|---|---|
| LINEAR VELOCITY: V[mm/sec] | 77 | 77 |
| NUMBER OF BEAMS: N | 1 | 1 |
| NUMBER OF POLYGON SURFACES: M | 6 | 3 |
| PIXEL DENSITY: ρ [dpi] | 1200 | 600 |
| REVOLUTION NUMBER: Rm[rpm] | 36378.0 | 36378.0 |
| V/N | 77.0 | 77.0 |

In PATTERN A of the example setting shown in TABLE 2, when the linear velocity is 77 mm/sec, the revolution number of the polygon mirror 57 is 18189.0 [rpm]. However, when the pixel density in the sub-scan direction is doubled from 600 dpi to 1200 dpi as shown in PATTERN A' in TABLE 3, the revolution number may be doubled, that is, the revolution number may be set to 36378.0 [rpm], which is twice as much as the revolution number of PATTERN A shown in TABLE 2. In PATTERN A', the pixel density is 1200 dpi, and the double-density scanning is performed.

As a result, the range of the revolution number of the polygon mirror is between 24212.6 and 36378.0 [rpm]. The range of the revolution number is reduced. It should be noted that the setting of PATTERN B through PATTERN C is the same as the example setting shown in TABLE 2.

Furthermore, when the plurality of reflective surfaces of the polygon mirror 57 is alternately exposed as shown in PATTERN A" in TABLE 3, the revolution number may be doubled, that is, 36378.0 [rpm]. In other words, the revolution number may be set to a value twice as much as the revolution number of PATTERN A shown in TABLE 2.

In this case, the range of the revolution number of the polygon mirror 57 may be between 24212.6 and 36378.0 [rpm]. Thus, the range of the revolution number may be reduced. It should be noted that the setting of PATTERN B through PATTERN C is the same as the example setting of TABLE 2.

In such a manner, when the linear velocity is less than 50% of the maximum process linear velocity, that is, V/Vmax is less than 0.5 (V/Vmax<0.5), the pixel density at least in the sub-scan direction may be doubled or the plurality of reflective surfaces of the polygon mirror is alternately exposed.

Accordingly, Rm, which is the revolution number of the polygon mirror 57, may be determined to satisfy the following expression:

$$Rmax \leq 1.5 \times Rmin$$

Therefore, the maximum revolution number may be approximately 1.5 times as much as the minimum revolution number of the rotary deflector. In other words, the range of the revolution number of the rotary deflector may be narrowed, and the characteristics of the rotary deflector or the motor that drives the rotary deflector may be more effectively used in an optimal condition.

Figure 2:
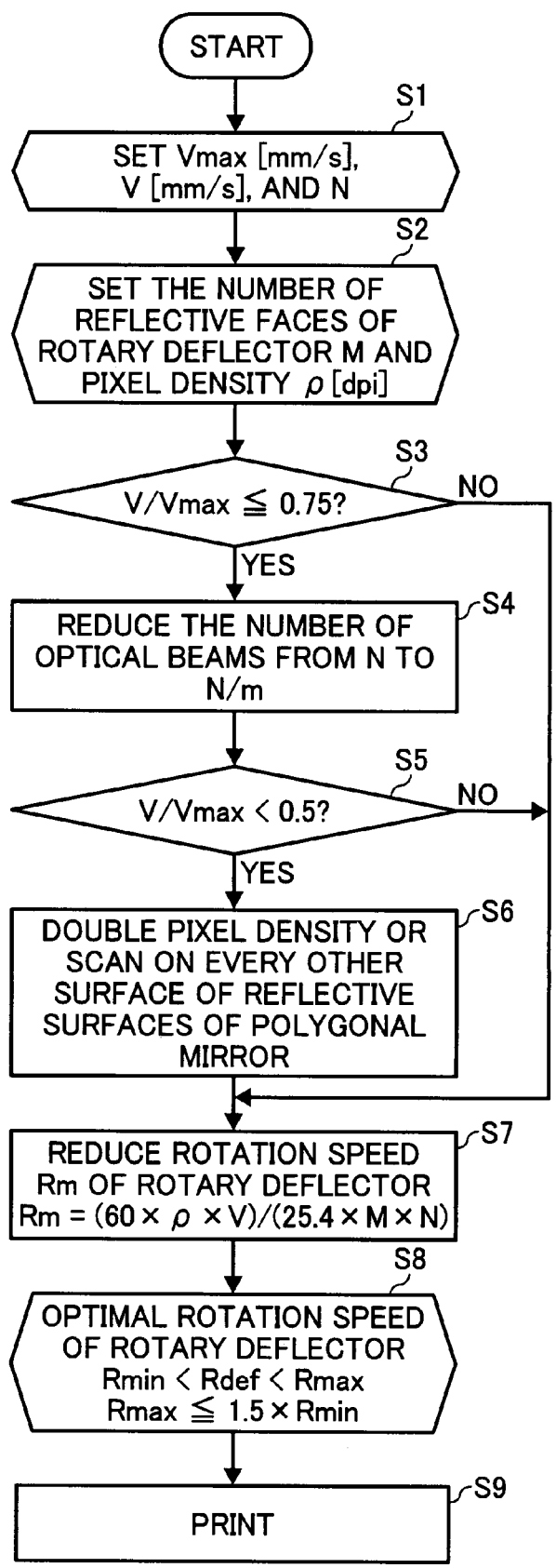
FIG. 2 is a flowchart showing a control procedure at a time the linear velocity is changed according to example embodiments.

Referring now to FIG. 2, there is shown a flowchart illustrating an example procedure of a control of the optical scanning apparatus 50 at a time the linear velocity is changed.

In the flowchart shown in FIG. 2, values necessary for controlling the optical scanning apparatus 50 are set in S1 and S2. In S1, the maximum process linear velocity (Vmax), the process linear velocity (V) subjected to be changed and the number of light beams of the optical source (N) are set.

In S2, the number of reflective surfaces of the rotary deflector (M) and the pixel density ρ [dpi] are set.

In S3, whether or not the linear velocity V is less than or equal to the 75% of the maximum process linear velocity (Vmax) is determined. When V/Vmax is greater than 0.75, the procedure advances to S7, and the revolution number of the rotary deflector is reduced.

On the other hand, when V/Vmax is less than or equal to 0.75 (V/Vmax≦0.75), the procedure advances to S4 where the number of the optical sources (N) is reduced to N/m where N and m are positive integers.

Furthermore, in S5, whether or not the liner velocity V is less than the 50% of the maximum process linear velocity Vmax (V/Vmax<0.5) is determined.

When the linear velocity is greater than or equal to the 50% of the maximum process linear velocity, the procedure advances to S7. In this case, the number of the light sources has been reduced in S4.

On the other hand, when the liner velocity V is less than the 50% of the maximum process linear velocity Vmax (V/Vmax<0.5), the pixel density is doubled or the plurality of the reflective surfaces of the polygon mirror is alternately scanned in S6. Subsequently, the procedure advances to S7. In this case, the number of the light sources has been reduced in S4.

In S7, the processing for reducing the revolution number of the rotary deflector is performed. The revolution number Rm is reduced to Rdef×(V/Vmax)×m, that is Rm=Rdef×(V/Vmax)×m. For example, Rm is reduced to (60×ρ×V)/(25.4×M ×N), that is, Rm=(60×ρ×V)/(25.4×M×N).

Accordingly, Rdef, which is the default revolution number of the polygon mirror 57, may fall between the minimum revolution number Rmin and the maximum revolution number Rmax (Rmin<Rdef<Rmax) in Step S8.

Furthermore, the maximum revolution number Rmax may be no more than 1.5 times as much the minimum revolution number Rmin (Rmax≦1.5×Rmin). Subsequently, the procedure advances to S9 and printing is carried out.

Next, a description will be given of example embodiments in which an output of the optical sources may be stabilized, and the operation life of the optical source is enhanced.

In example embodiments, the optical scanning apparatus 50 may be controlled such that given V and N, the following expression is satisfied:

$$0.5 \times (Vmax/Ndef) < V/N < 1.5 \times (Vmax/Ndef)$$

As described above, when a constant k, which is obtained based on an optical specification of the scan lens disposed in the optical scanning apparatus 50, an exposure sensitivity and a necessary exposure width of the photoreceptor are fixed, the exposure light amount P onto the photoreceptor may be given by:

P=k×V/N, where V[mm/sec] is a linear velocity and N is a number of light sources.

Therefore, in a case where the process linear velocity is changed in order to keep an exposure energy to the photoreceptor at a constant level per unit of time, it may be necessary to change an amount of the exposure light onto the photoreceptor for forming a latent image on the image carrier, accordingly.

In other words, the output of the light emission of the laser beam from the light source may be changed in accordance with the change in the process linear velocity.

The laser diode used as an optical source, for example, may not be able to stably emit light in an output range less than or equal to 15% of a rated output. Consequently, there may be a problem associated with a beamspot diameter and an LD modulation.

As a result, an image deviation may occur. In addition, when the laser diode is used at the rated output limit, it may accelerate the deterioration of the product life of the laser diode. Thus, the reliability of the entire apparatus may also be adversely affected.

In light of the above, according to example embodiments, the optical scanning apparatus 50 is controlled in a manner such that the following relationship may be satisfied:

$$0.5 \times (Vmax/Ndef) < V/N < 1.5 \times (Vmax/Ndef)$$

With reference to the example setting of TABLE 2, in the ratio V/N, where V is a linear velocity, and N is the number of light sources, the minimum value of V/N is 77 in PATTERN A; whereas, the maximum value of V/N is 154 in PATTERN C, and the default value is 115 in PATTERN E. The value of V/N in PATTERN B is the same as the default value 115. The value of V/N in PATTERN D is 102.5. These values satisfy the relationship expressed by:

$$0.5 \times (V\text{max}/N\text{def}) < V/N < 1.5 \times (V\text{max}/N\text{def}).$$

In other words, in the necessary light amount given by P=k×V/N, the range of the light amount may be configured to be no more than 1.5 times at the upper limit and no more than 0.5 times at the lower limit. Accordingly, it is possible to use the light source in a range having enough allowance both at the upper and lower limits with respect to the rated output of the light source.

In this range, it may not be necessary to readjust the output of light emission when switching between the process linear velocities. The optimal light amount may easily be obtained by changing the number of oscillation pulses of the PWM control of the light source.

Normally, the PWM control may be changed by electronic control. For example, when a type or a thickness of transfer paper is specified, a corresponding process linear velocity may be selected, and in the meantime, the oscillation pulse of the optical source may be regulated.

On the other hand, it is known that in related art apparatuses when an amount of incident light to a synchronous detector in the optical scanning apparatus varies, the output may also vary. Consequently, an appropriate timing of the writing start position may not be obtained.

As a result, an image deviation due to the fluctuation of image, deterioration of the accuracy of the color alignment and/or deterioration of the reproduction of color during full-color image formation may be generated.

In the optical scanning apparatus according to example embodiments, the electronic control may be performed such that the amount of incident light to the synchronous detector, that is, the synchronous detection sensor 61 as shown in FIG. 1 is maintained at a certain amount.

For example, at a time the laser beam is led to the synchronous detection sensor 61 disposed outside an exposure area, the linear velocity is regulated at the default linear velocity, that is, the light amount at Vmax in this case.

After the synchronous detection sensor 61 detects the light, there may be a little time lag or a delay until the actual exposure scan is performed on the photoreceptor. Using the time lag or the delay, a control for recovering the original amount of the exposure light, that is, the amount of the exposure light to actually write may be performed.

Referring now to FIG. 3, a conceptual view of the control of the optical scanning apparatus is illustrated. As illustrated in FIG. 3, the linear velocity is regulated at the default linear velocity from the start of scan to the time at which the synchronous detection is performed. The same may be said for PATTERN B and PATTERN E. Subsequent to the synchronous detection, the linear velocity is switched to the linear velocity of the respective pattern.

There is a time lag between the synchronous detection and the start of exposure. Consequently, the output of the light source is the original amount of the exposure light or the amount of the exposure light to actually write until the start position of the exposure. From the start of the exposure to the end of the exposure, the light source emits a certain amount of light at each linear velocity of PATTERN A through PATTERN E, and writing is performed.

Accordingly, an appropriate timing of the writing start position in the optical scanning apparatus is obtained. As a result, an image deviation due to the fluctuation of image, deterioration of the accuracy of color alignment and/or deterioration of the reproduction of color during full-color image formation may be prevented or reduced. Thus, a favorable image may be obtained.

Furthermore, in the optical scanning apparatus according to example embodiments, when changing the revolution number of the rotary deflector or the polygon mirror 57, the writing start position in the main scan direction is corrected per dot. For example, the writing start position in the main scan direction is corrected per dot based on a detection timing of the synchronous detection sensor 61. The control of the correction itself may be realized by a common electronic control.

Thereby, a more accurate writing start position may be obtained. An image deviation due to the fluctuation of image, deterioration of the accuracy of color alignment and/or deterioration of the reproduction of color during full-color image formation may be prevented or reduced. Thus, a favorable image may be obtained.

An optical scanning apparatus according to example embodiments may be structured such that the exposure scanning may be performed using an optical source among the plurality of optical sources provided in the optical scanning apparatus. In example embodiments, the two light sources, the laser diodes 51 and 52, are provided.

However, when the number of beams N is 1 (N=1) as shown in the example settings in TABLE 2 and TABLE 3, the arbitrary light source from either the laser diode 51 or the laser diode 52 may be used so as to perform the exposure scan.

Thereby, if, by any chance, any of the plurality of light sources fails or deteriorates so that it becomes impaired early in the product life, an operation mode which reduces the number of light sources may be selected from, for example, PATTERNs A, B, C, A' and A" in TABLEs 2 and 3 so that an interim operation may be performed without stopping the apparatus. Thereby, the image formation may be continuously performed.

In addition, for a user who does not need a high-speed printing, for the sake of extending the product life of the light sources, the light sources may be used in a mode by which the number of beams is reduced. Accordingly, even if a light source becomes impaired, the apparatus may be able to continuously operate.

Figure 4:
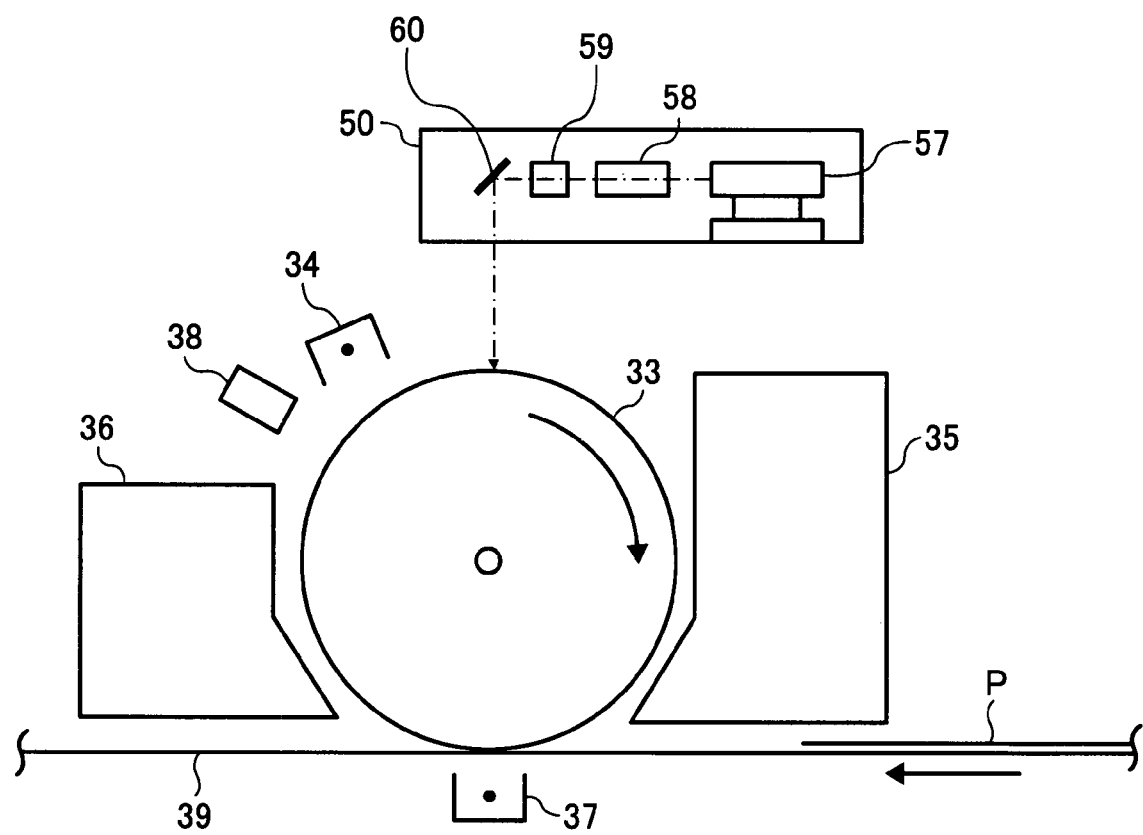
FIG. 4 is a schematic diagram illustrating an image forming area of an example of a monochrome image forming apparatus according to example embodiments.

Referring now to FIG. 4, there is shown a schematic diagram illustrating an imaging portion of an example monochrome image forming apparatus.

In FIG. 4, surrounding a photoreceptor drum 33 serving as an image carrier are: a charging unit 34, a developing unit 35, a cleaning unit 36, a transfer mechanism 37, a discharging unit 38 and so forth. The optical scanning apparatus 50 is provided above the photoreceptor drum 33.

The structure of the optical scanning apparatus 50 for the monochrome image forming apparatus is similar to, if not the same, the structure of the optical scanning apparatus 50 described in FIG. 1. The optical scanning apparatus 50 is equipped with the polygon mirror 57 serving as a rotary deflector, Fθ lenses 58, the toroidal lens 59 and the reflective mirror 60.

Though not illustrated in FIG. 4, the optical scanning apparatus 50 may be further equipped with the first laser diode 51 and the second laser diode 52, and the synthetic prism 55. The first laser diode 51 and the second laser diode 52 constitute the multi-beam light source unit and are similar to, if not the same, the first laser diode and the second laser diode, and the synthetic prism described in FIG. 1.

In the monochrome image forming apparatus having such a structure according to example embodiments, the surface of the photoreceptor drum 33 is evenly charged at a predetermined or given potential by the charging unit 34.

In the exposure apparatus 50, the laser diode is driven based on image data sent by a host machine, for example, a personal computer (PC), so as to irradiate the polygon mirror 57 with the laser beam. Then, the reflective light is led onto the photoreceptor drum 33 through the cylinder lens or the like.

Subsequently, an electrostatic latent image is formed on the photoreceptor drum 33. Toner is deposited on the electrostatic latent image by the developing unit 35. Consequently, the electrostatic latent image is visualized as a toner image.

The sheet S fed by a paper feeder (not shown) is transported by resist rollers (not shown) at a timing the toner image is formed on the photoreceptor drum 33.

Subsequently, the sheet S is sucked to a transfer conveyance belt 39 and is transported to a transfer position. The toner image on the photoreceptor drum 33 is transferred onto the sheet S at a transfer position where the photoreceptor drum 33 and a transfer mechanism 37 are facing each other.

The sheet S on which the toner image is transferred is then transported to a fixing unit (not shown). Subsequently, the unfixed toner image is fixed on the sheet S in the fixing unit, and the sheet S is ejected out of the image forming apparatus.

The residual potential on the photoreceptor drum 33 after the toner image is transferred is removed by the discharging unit 38 so as to be able to prepare for the next imaging.

The monochrome image forming apparatus of example embodiments may be configured such that the process linear velocity is changeable. For example, the monochrome image forming apparatus may include the different modes of the patterns A, B and E shown in TABLE 2.

When switching the process linear velocity, the optical scanning apparatus 50 is controlled in a similar or the same manner as the optical scanning apparatus shown in FIG. 1 described above. Accordingly, the range of the revolution number of the polygon mirror 57 may be set to be narrow, and the characteristics of the rotary deflector or the motor for driving the rotary deflector may be used in a more favorable condition.

Similar to the case of the optical scanning apparatus 50 shown in FIG. 1, the double-density scan, scanning on every other surface of reflective surfaces, or the operations described in TABLE 3 may be performed.

Next, with reference to FIG. 5, a description will be given of an example of a color-image forming apparatus.

Figure 5:
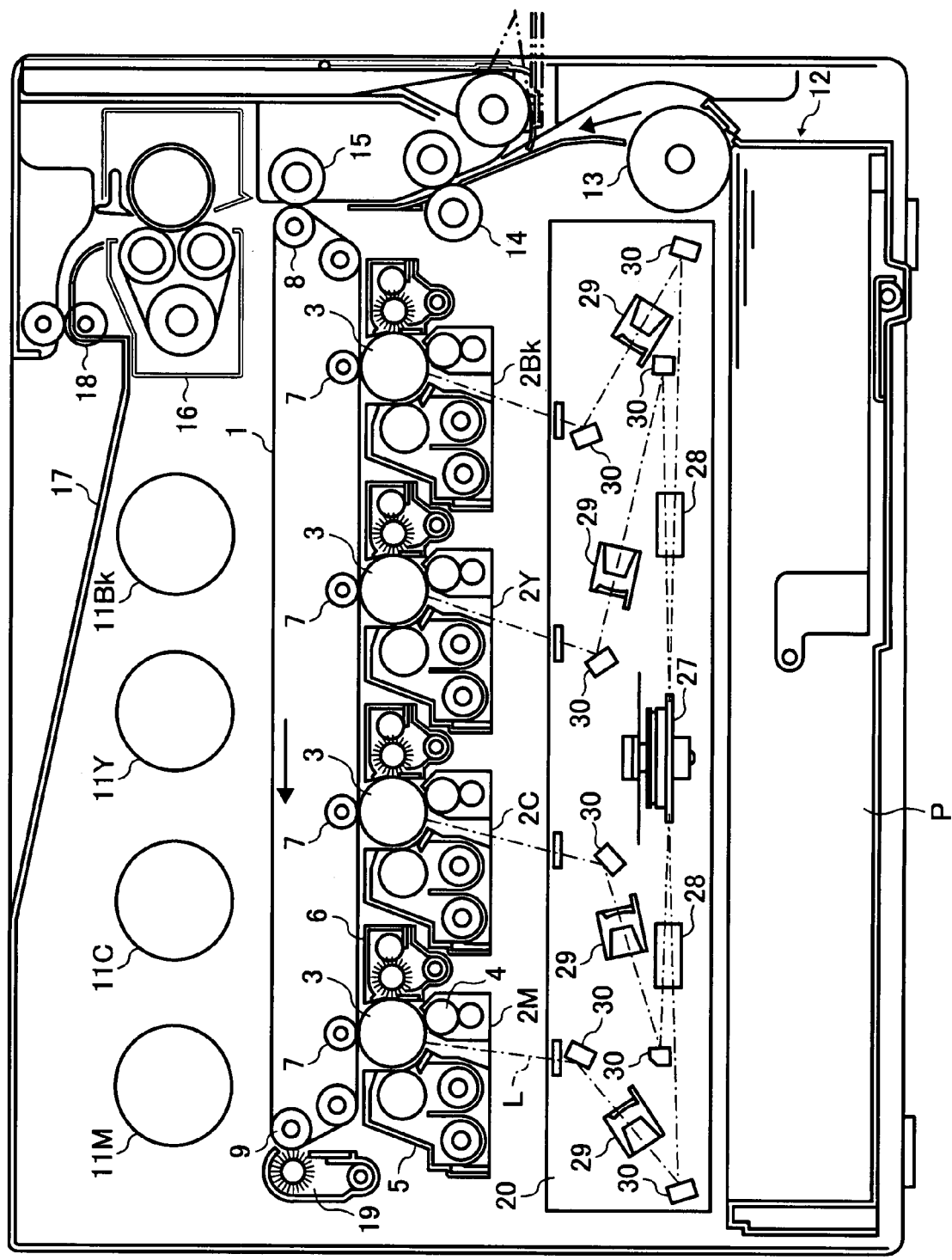
FIG. 5 is a cross sectional view illustrating an example of a full-color image forming apparatus according to example embodiments;.

FIG. 5 is a cross-sectional view illustrating a tandem-type full color printer as an example of the color image forming apparatus in which a plurality of imaging units are arranged side by side. In the color image forming apparatus according to example embodiments, four imaging units may be disposed.

In the full color printer according to example embodiments, four imaging units 2M for magenta, 2C for cyan, 2Y for yellow and 2Bk for black are disposed side by side along the bottom of an intermediate transfer belt 1 in a traveling direction. Below the four imaging units 2M, 2C, 2Y and 2Bk, there is provided an optical scanning apparatus 20.

Further below the optical scanning apparatus 20, there is provided a sheet feed cassette 12. At one end portion of the sheet feed cassette 12 is disposed a sheet feeding mechanism 13 which feeds a recording material P such as transfer paper or the like stored in the sheet feed cassette 12.

In an upward direction of the sheet feeding mechanism 13, resist rollers 14 are provided. A transfer roller 15 serving as a secondary transfer mechanism is disposed further upward the resist rollers 14. A fixing unit 16 is disposed in the upward direction of a secondary transfer portion where the transfer roller 15 is in contact with the intermediate transfer belt 1 through pressure.

An upper surface of the full color printer is structured such that the upper surface serves as a catch tray 17. Also provided on the upper surface of the full color printer are sheet eject rollers 18 for ejecting the recording material P such as a transfer paper or the like after being fixed. Toner bottles 11 M, 11C, 11Y, 11Bk for storing toner of each respective color are also provided on the upper portion of the full color printer.

The structure and operations of the imaging units 2M, 2C, 2Y and 2Bk described above are practically similar to each other, if not the same. The difference between the four imaging units is the colors of toner between magenta (M), cyan (C), yellow (Y) and black (Bk). Thus, a description will be given of the imaging unit 2M disposed at the left end portion of the full color printer in FIG. 5 as a representative example. Letter symbols that denote toner colors are omitted herein.

The imaging unit 2 includes a photoreceptor drum 3 serving as an image carrier. The photoreceptor drum 3 is driven in a rotating manner in a clockwise direction in FIG. 5 by a driving mechanism (not shown).

Around the photoreceptor drum 3 are disposed a charging roller 4, a developing unit 5, a cleaning unit 6 and so forth. The developing unit 5 is a two-component developing unit composed of toner and carrier. The developing unit 5 provides the photoreceptor drum 3 with the toner carried by a developing sleeve.

A transfer roller 7 serving as a primary transfer mechanism is disposed opposite to the photoreceptor drum 3, with the intermediate transfer belt 1 interposed therebetween.

The intermediate transfer belt 1 is spanned between a plurality of supporting rollers and is driven in a rotating manner in a counterclockwise direction shown by an arrow in FIG. 5. One of the supporting rollers is an opposing roller 8 disposed facing the secondary transfer roller 15.

On the other end of the intermediate transfer belt 1, that is, the other side of the opposing roller 8, is disposed a supporting roller 9. An intermediate transfer belt cleaning unit 19 is disposed across from the supporting roller 9, with the intermediate transfer belt 1 interposed therebetween. The intermediate transfer belt cleaning unit 19 is in contact with the intermediate transfer belt 1 through pressure.

The optical scanning apparatus 20 is configured such that the scan light irradiates the four imaging units 2M, 2C, 2Y and 2Bk. The optical scanning apparatus 20 is basically similar to, if not the same, the optical scanning apparatus 50 shown in FIG. 1. The optical scanning apparatus 20 is equipped with a polygon mirror 27 serving as a rotary deflector, fθ lenses 28, toroidal lenses 29 and mirrors 30.

The optical scanning apparatus 20 according to example embodiments is a multi-beam optical scanning apparatus. Similar to the optical scanning apparatus 50 described in FIG. 1, the optical scanning apparatus 20 may include two laser diodes, collimating lenses, a synthetic prism, a cylindrical lens and so forth. However, descriptions thereof are omitted in FIG. 3.

A description will be given of a printing operation of the full-color printer according to example embodiments. In the imaging unit 2M for magenta, the surface. of the photoreceptor drum 3 is uniformly charged at a, predetermined or given potential by the charging roller 4.

In the exposure apparatus 20, the laser diodes (not shown) are driven so as to irradiate the polygon mirror 27 with the laser beam based on image data sent from a host device, for example, a personal computer (PC).

Subsequently, the reflected light is led to the photoreceptor drum 3 by way of the cylindrical lens and so forth. An electrostatic latent image to develop in the color of magenta is formed on the photoreceptor drum 3. Toner is provided to the latent image from the developing unit 5. Accordingly, a visible image in the magenta toner is formed.

In other imaging units 2C, 2Y and 2Bk, similar to the imaging unit 2M for the color of magenta, a visible image of each toner color is formed on the surface of each respective color of photoreceptor drum 3. Then, the visible images of different colors are overlaid on one another and are transferred on the intermediate transfer belt 1.

A sheet designated as a transfer material is supplied from the sheet feeding unit 12. The supplied sheet temporarily comes into contact with a pair of resist rollers 14 provided on the upstream side of the sheet conveyance direction.

Subsequently, the sheet is transported to the secondary transfer position where the secondary transfer roller 15 is in contact with the intermediate transfer paper 1 through pressure. Accordingly, the toner image is transferred on the sheet by the operation of the secondary transfer roller 15.

In a case of monochrome printing, a visible image of black toner is formed on the surface of the photoreceptor drum 3 in the imaging unit 2Bk for the color of black. The toner image of black is transferred on the sheet.

The sheet on which the toner image is transferred is fixed by the fixing unit 16 and is then ejected on the catch tray 17 provided on the upper surface of the printer. At this time, the sheet is turned over and is ejected on the catch tray 17 surface down. Thereby, when the sheet is ejected surface down by turning over the sheet, the sheet which is printed in a sequential sheet order is sequentially collated in the original sequential sheet order.

In the color image forming apparatus according to example embodiments, the process linear velocity is switchably configured. For example, the process linear velocity may be changed between different patterns or modes A through E. When switching the process linear velocity, the optical scanning apparatus 20 is regulated in a similar manner as the optical scanning apparatus 50 as described in FIG. 1.

Accordingly, the range of the revolution number of the polygon mirror 27 may be configured to be narrow so that the characteristics of the rotary deflector or the motor that drives the rotary deflector may be used in a more favorable condition. Similar to the optical scanning apparatus 50 of FIG. 1, it is possible to perform the double scan, scanning on every other surfaces of reflective surfaces, or the operations described in TABLE 3.

Example embodiments are described with reference to the drawings. However, example embodiments are not limited to the specific terminology so selected. For example, the threshold value to regulate the optical scanning apparatus is not limited to 75% of the maximum process linear velocity. The threshold value may be set to any appropriate value.

The number of light sources of the optical scanning apparatus is not limited to two. The number of light sources may be three or more. The number of reflective surfaces of the rotary deflector is not limited to six. Furthermore, the configuration of each portion of the optical scanning apparatus may be modified as needed.

The number of switching modes of the linear velocity is not limited to five. It is possible to set an arbitrary number of switching modes. It is also possible to set an arbitrary linear velocity at each pattern or mode, and to set a pixel density and so forth.

In the image forming apparatus equipped with an optical scanning apparatus, the imaging portion and so forth may be arbitrarily configured. The optical scanning apparatus may be configured such that the scan light is led to the image carrier.

The image forming apparatus is not limited to a printer. The image forming apparatus may be a copier, a facsimile or a multi-function printer having a plurality of different functions.

Example embodiments may be implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

Example embodiments may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods, when run on a computer device (a device including a processor). Thus, the storage medium or computer readable medium, is adapted to store information and is adapted to interact with a data processing facility or computer device to perform the method of any example embodiment.

The storage medium may be a built-in medium inside a computer device main body or removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the following claims, and all such modifications as would be obvious to one skilled in the art are intended to be included within the scope of the following claims.

What is claimed is:

1. An optical scanning apparatus, comprising:
a plurality of light sources configured to emit light beams; and
a rotary deflector configured to deflect the light beams,
wherein a revolution number (Rm) of the rotary deflector is reduced to $Rdef \times (V/Vmax)$ if $V/Vmax$ is greater than a value; and the revolution number (Rm) thereof is reduced to $Rdef \times (V/Vmax) \times m$ and the number of the light beams is reduced to $Ndef/m$ if $V/Vmax$ is not greater than the value when the revolution number of the rotary deflector, or the revolution number thereof as well as the number of the light beams are changed in accordance with switching of a process linear velocity of an image forming apparatus, wherein V is a process linear velocity of the image forming apparatus; Vmax is a maximum process linear velocity thereof; Ndef is the number of the light beams at the maximum process linear velocity Vmax; and Rdef is the revolution number of the rotary deflector thereat; and m is a positive integer, and wherein Vmax is greater than V (Vmax>V).

2. The optical scanning apparatus according to claim 1, wherein the value is 0.75.

3. The optical scanning apparatus according to claim 1, wherein the following relationship is satisfied when Rm is greater than Rdef (Rm>Rdef):

$Rm/Rdef < 1.5$.

4. The optical scanning apparatus according to claim 1, wherein a pixel density in a sub-scan direction is at least doubled when V/Vmax is less than 0.5 (V/Vmax<0.5).

5. The optical scanning apparatus according to claim 1, wherein the rotary deflector comprises a plurality of reflective surfaces, and wherein the plurality of reflective surfaces are alternately irradiated when V/Vmax is less than 0.5 (V/Vmax<0.5).

6. The optical scanning apparatus according to claim 1, wherein Rm satisfies the following relationship:

$Rmax < 1.5 \times Rmin$ wherein Rmax is a maximum revolution number and Rmin is a minimum revolution number of the rotary deflector.

7. The optical scanning apparatus according to claim 1, wherein the following relationship is satisfied:

$5 \times (Vmax/Ndef) < V/N < 1.5 \times (Vmax/Ndel)$ wherein, N is the number of light beams.

8. The optical scanning apparatus according to claim 1, further comprising:

a synchronous detector configured to regulate a write start position in a main scan direction, wherein the synchronous detector receives a constant amount of incident light.

9. The optical scanning apparatus according to claim 8, wherein the write start position in the main scan direction is adjusted by a dot unit when changing the revolution number of the rotary deflector.

10. The optical scanning apparatus according to claim 1, wherein scanning is performed using any number of light sources when reducing the number of optical beams of the light sources.

11. An image forming apparatus, comprising:

the optical scanning apparatus of claim 1, wherein the image forming apparatus can switch between a plurality of process linear velocities.

12. The image forming apparatus of claim 11, wherein the image forming apparatus is a color-image forming apparatus.

13. The image forming apparatus of claim 12, wherein the color-image forming apparatus is a tandem-type full color printer.

14. The image forming apparatus of claim 11, wherein the image forming apparatus is a monochrome image forming apparatus.

15. A method of controlling an optical scanning apparatus, comprising:

reducing a revolution number (Rm) of a rotary deflector to Rdef×(V/Vmax) if V/Vmax is greater than a value; and reducing the revolution number (Rm) thereof to Rdef×(V/Vmax)×m and a number of the light beams to Ndef/m if V/Vmax is not greater than the value when the revolution number of the rotary deflector, or the revolution number thereof and the number of the light beams are changed in accordance with switching of a process linear velocity of an image forming apparatus, wherein V is a process linear velocity of the image forming apparatus; Vmax is a maximum process linear velocity thereof; Ndef is the number of the light beams at the maximum process linear velocity Vmax; and Rdef is the revolution number of the rotary deflector thereat; and m is a positive integer, and wherein Vmax is greater than V (Vmax>V).

16. The method of controlling an optical scanning apparatus according to claim 15, wherein the value is 0.75.

* * * * *